(12) United States Patent
Tsakiris et al.

(10) Patent No.: US 8,979,448 B2
(45) Date of Patent: Mar. 17, 2015

(54) PALLET HAVING RECONFIGURABLE TIE-DOWN SYSTEM

(75) Inventors: Mark K. Tsakiris, Wilmington, DE (US); Mark Alkire Brunton, Merchantville, NJ (US); Roger W. Lacy, West Chester, PA (US)

(73) Assignee: The Boeing Company, Chicago, IL (US)

( * ) Notice: Subject to any disclaimer, the term of this patent is extended or adjusted under 35 U.S.C. 154(b) by 1353 days.

(21) Appl. No.: 12/369,694

(22) Filed: Feb. 11, 2009

(65) Prior Publication Data

US 2010/0200695 A1  Aug. 12, 2010

(51) Int. Cl.
*B60P 7/08* (2006.01)
*B64C 1/20* (2006.01)

(52) U.S. Cl.
CPC ........................................ *B64C 1/20* (2013.01)
USPC .............................................. 410/80; 410/46

(58) Field of Classification Search
CPC ........ B60P 3/40; B60P 7/0807; B60P 7/0815; B60P 7/13; B60P 7/132; B64D 9/003
USPC ................... 410/46, 84, 80, 77, 92; 206/386; 414/498; 244/118.1, 137.1; 108/57.15, 108/54.1; 248/346.02
See application file for complete search history.

(56) References Cited

U.S. PATENT DOCUMENTS

| | | | |
|---|---|---|---|
| 4,046,347 A | 9/1977 | Bryan | |
| 4,068,813 A | 1/1978 | Chatwin et al. | |
| 4,077,532 A | 3/1978 | Bryan | |
| 4,108,455 A | 8/1978 | James | |
| 4,395,172 A | 7/1983 | Hoener et al. | |
| 4,780,043 A | 10/1988 | Fenner et al. | |
| 4,824,050 A | 4/1989 | Courter | |
| 4,875,645 A | 10/1989 | Courter | |
| 5,111,950 A | 5/1992 | Wylenzek | |
| 5,547,321 A | 8/1996 | Thomas | |
| 6,027,291 A * | 2/2000 | Sain et al. ........................ | 410/35 |
| 6,427,947 B1 | 8/2002 | Rohrlick et al. | |
| 6,450,744 B1 | 9/2002 | Gilhuys et al. | |
| 6,488,457 B2 | 12/2002 | Diamante | |
| 6,539,881 B2 | 4/2003 | Underbrink et al. | |
| 6,729,818 B1 | 5/2004 | Yee et al. | |
| 6,749,382 B2 | 6/2004 | Lambie | |
| 6,769,368 B2 | 8/2004 | Underbrink et al. | |
| 7,118,314 B2 * | 10/2006 | Zhou et al. ........................ | 410/84 |
| 2002/0108540 A1 | 8/2002 | Underbrink et al. | |
| 2003/0097967 A1 | 5/2003 | Underbrink et al. | |
| 2007/0104562 A1 | 5/2007 | Wells et al. | |
| 2008/0135681 A1 | 6/2008 | Hearing et al. | |

* cited by examiner

*Primary Examiner* — Stephen Gordon
(74) *Attorney, Agent, or Firm* — Parsons Behle & Latimer

(57) ABSTRACT

A pallet system includes a pallet upon which cargo or other payloads may be carried. The pallet has a plurality of tie-down locations at which the pallet may be tied-down on a base, and at least one tie-down device for tying down the pallet on the base at any of the tie-down locations. The pallet further includes structure for mounting the tie-down device on the pallet at any of the tie-down locations.

6 Claims, 10 Drawing Sheets

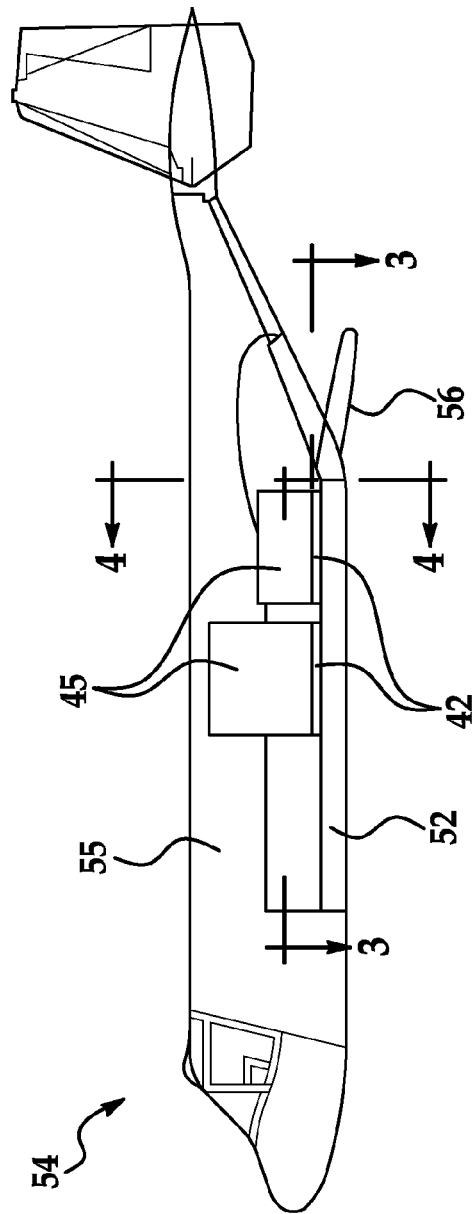
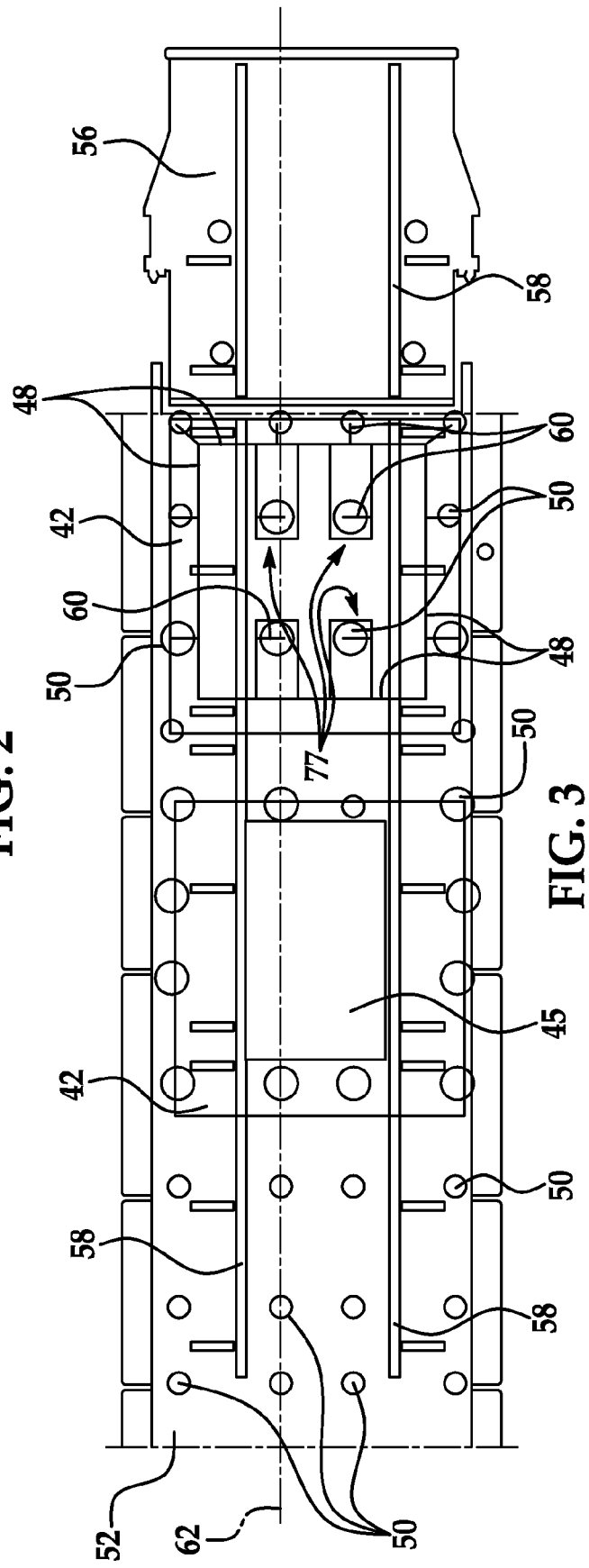

PALLET HAVING RECONFIGURABLE TIE-DOWN SYSTEM

TECHNICAL FIELD

This disclosure generally relates to cargo carriers, and deals more particularly with a pallet having a reconfigurable tie-down system for securing the pallet to a base, such as the floor of an aircraft.

BACKGROUND

Pallets are commonly used to move cargo or other payloads in the transportation industry, using a variety of vehicles including aircraft, trucks, trains and vessels. In order to prevent shifting of cargo loads during transport, the pallets and/or the cargo on the pallets may be tied down to the floor of the vehicle using floor anchors. These floor anchors, which are often in the form of embedded tie-down rings, are normally arranged in a fixed pattern over the floor.

In the past, pallets have been provided with fixed tie-down mechanisms that are generally arranged in a pattern on the pallet that may align with the floor anchors of a vehicle. This arrangement, however, may limit the use of such pallets to those vehicles having floor anchors matching the layout of the tie-down mechanisms on the pallet. In some cases, only some of the tie-down mechanisms on a pallet may be used for a particular shipment. In this situation, the unused tie-down mechanisms may present obstructions to the movement of the pallets and/or cargo within the vehicle.

Accordingly, there is a need for a pallet having a tie-down system that may readily adapt the pallet for use with vehicles having differing patterns of floor anchors. There is also a need for a tie-down system that may be easily and quickly reconfigured, and which allows unused tie-down devices to be removed from the pallet and stowed.

SUMMARY

According to the disclosed embodiments, a pallet is provided with a reconfigurable tie-down system which adapts the pallet for use in vehicles having differing floor configurations, including differing patterns of floor anchors. The tie-down system includes tie-down devices that may be easily and quickly moved while on the pallet to locations matching floor anchors, without the need for removing and then reinstalling the devices. The disclosed tie-down devices are recessed in the pallet and therefore do not present obstructions which interfere with cargo loading or movement. Unused tie-down devices on the pallet may be easily removed and stowed until needed.

According to one disclosed embodiment, a pallet includes a reconfigurable tie-down system. The pallet includes a plurality of tie-down locations at which the pallet may be tied down on a base. At least one tie-down device is provided for tying down the pallet on the base at any of the tie-down locations. Means are provided for mounting the tie-down device on the pallet at any of the tie-down locations. The mounting means may include a channel on the pallet in which the tie-down device may be slideable between at least two of the tie-down locations in the pallet. Each of the tie-down devices may include an end effector, a base slideable within a channel on the pallet, and an arm connecting the end effector with the base. The mounting means may further include a slot in the pallet at each of the tie-down locations which extends generally transverse to the channel and receives the arm of the tie-down device in order to lock the tie-down device in place. The pallet may include an access opening at each of the tie-down locations to allow the tie-down device to access the base.

In accordance with another embodiment, a reconfigurable tie-down system is provided for tying down a pallet on a base having a plurality of anchors. The system includes a pallet upon which cargo may be supported, and a plurality of tie-down devices for tying down the pallet on the base at one or more of the anchors. Means are provided for mounting the tie-down device for sliding movement on the pallet to any of a plurality of the tie-down locations on the pallet. The pallet may include an access opening therein at each of the tie-down locations for allowing access to the base through the pallet. The access openings are positioned on the pallet such that relative movement between the pallet on the base will bring at least certain of the access openings into registration with at least certain of the anchors on the base. The pallet may further include an access station along the channel for allowing the tie-down devices to be removed from the pallet.

According to a disclosed method embodiment, tying down a pallet on a base comprises selecting a plurality of possible tie-down mounting locations on the pallet that may be brought into registration with anchors in the base through relative movement between the pallet and the base. The method includes relatively moving the pallet and the base to bring at least certain of the mounting locations on the pallet into registration with at least certain of the anchors. The method includes mounting a tie-down device on the pallet at each of the tie-down locations that has been brought into registration with one of the anchors. The tie-down devices are used to tie-down the pallet to the anchors.

The disclosed embodiments satisfy the need for a pallet having a reconfigurable tie-down system which addresses limitations of the prior tie-down mechanism and provides a highly flexible pallet that may be adapted for use with various vehicles having differing fixed patterns of floor anchors.

BRIEF DESCRIPTION OF THE ILLUSTRATIONS

FIG. 2 is an illustration of a typical cargo airplane in which cargo pallets are tied down to a floor using the reconfigurable tie-down system of the disclosed embodiments.

FIG. 3 is a sectional illustration taken along the line 3-3 in FIG. 2.

DETAILED DESCRIPTION

Figure 1:
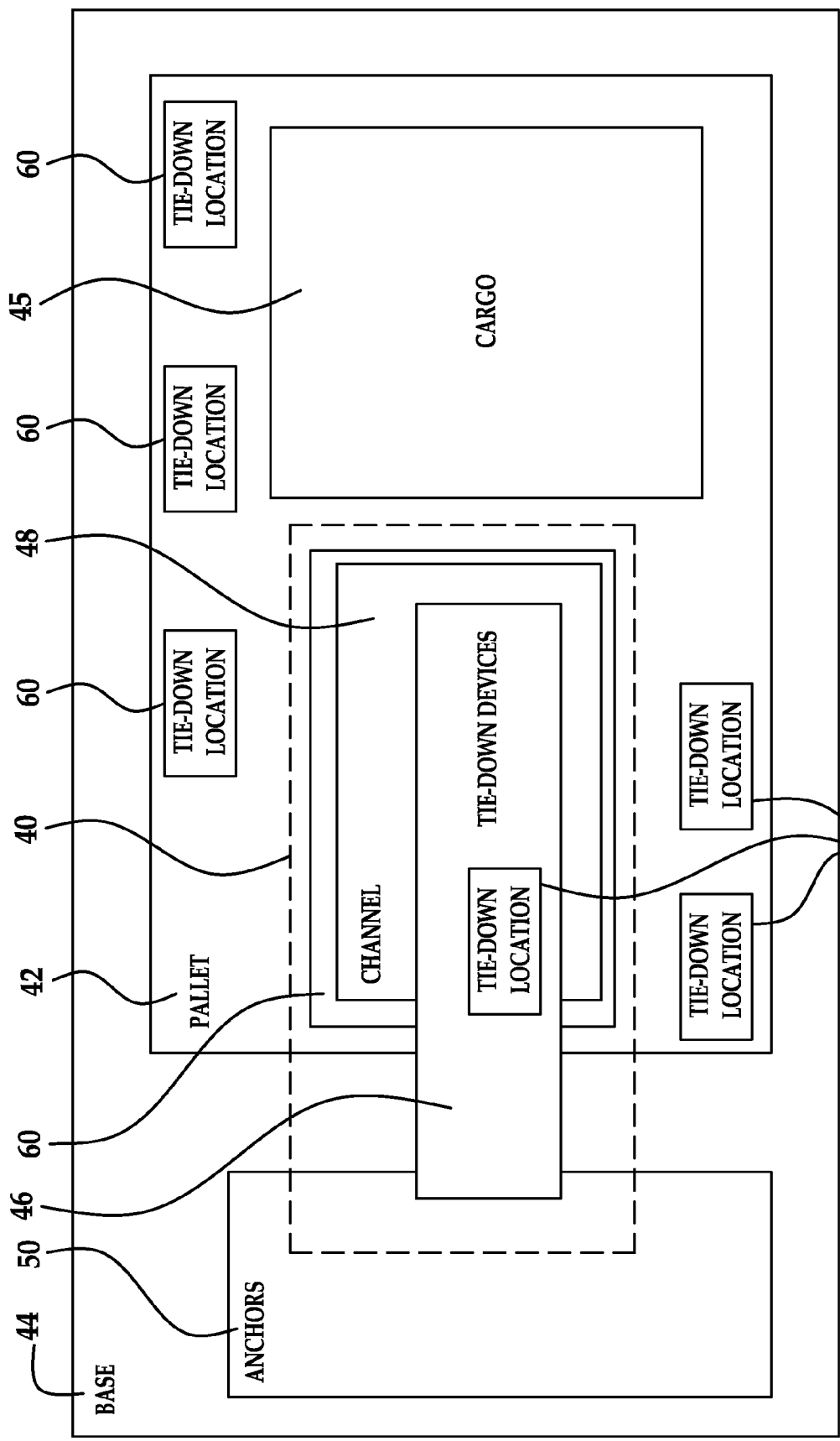
FIG. 1 illustrates a functional block diagram of a pallet having a reconfigurable tie-down system according to the disclosed embodiments.
Figure 4:
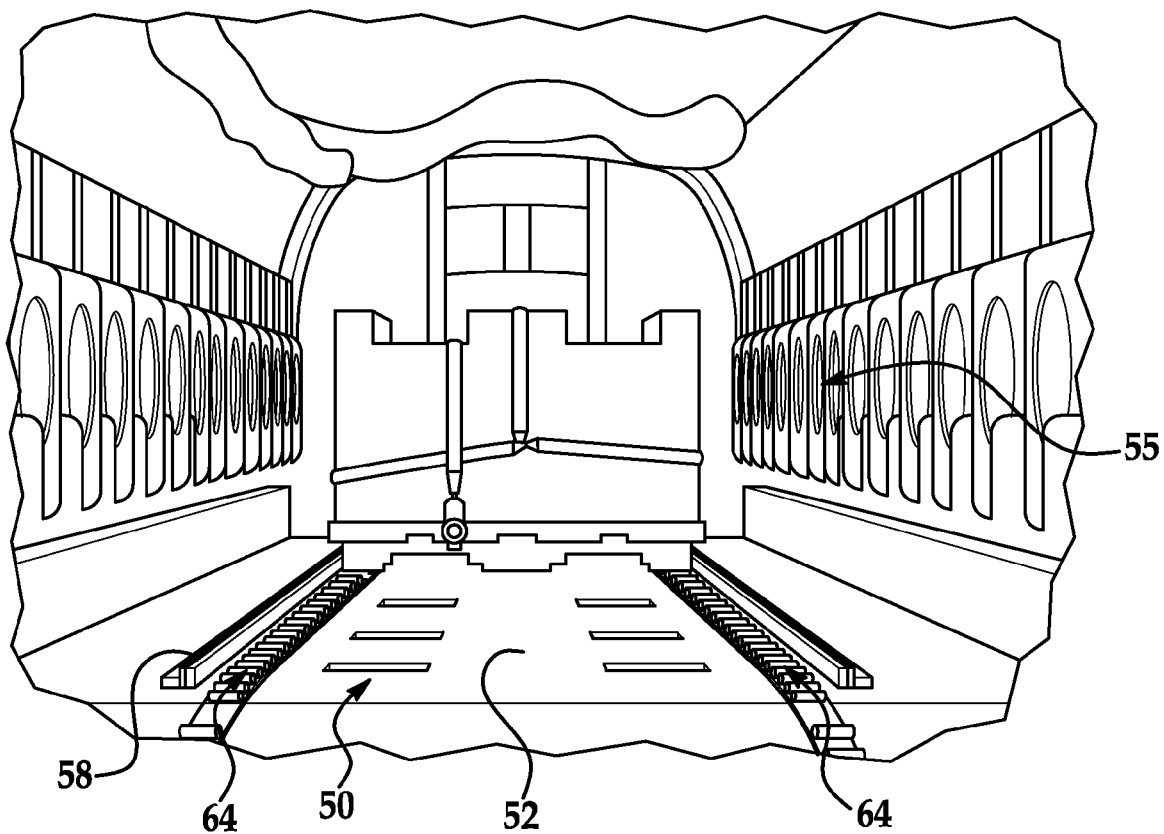
FIG. 4 is a sectional illustration taken along the line 4-4 in FIG. 2, but with the pallets having been removed to better illustrate the cargo floor.
Figure 5:
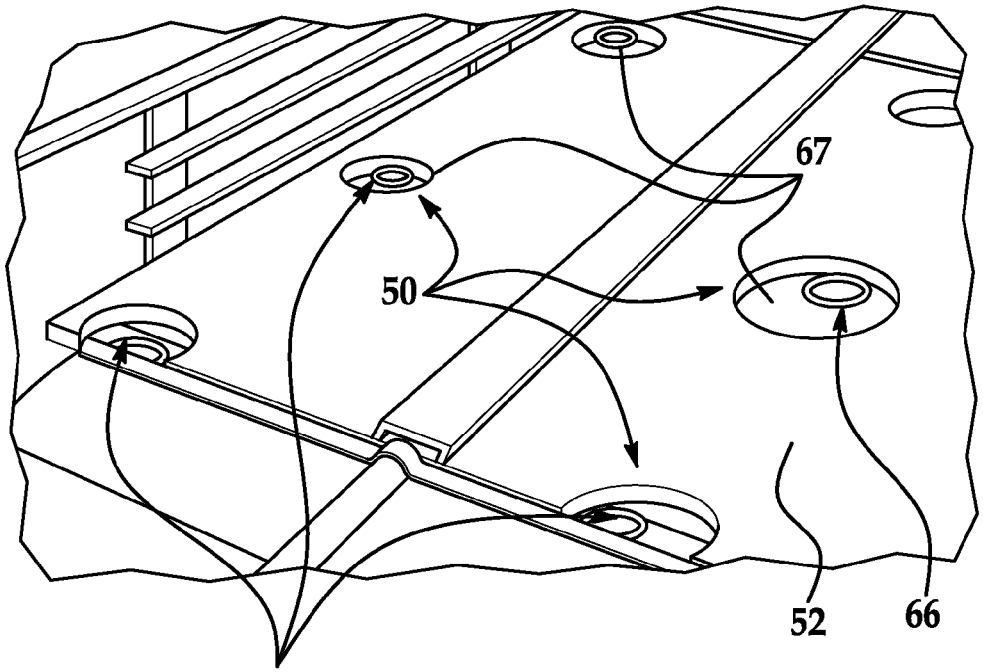
FIG. 5 is an illustration of the cargo floor of FIGS. 2 and 4, better showing the floor anchors.

Referring first to FIG. 1, the disclosed embodiments generally relate to a pallet 42 having a reconfigurable tie-down system 40 for tying down and securing the pallet 42 to a base 44. The pallet 42 may be used to transport various types of cargo 45 which is supported on the pallet 42 and may be tied down to either the pallet 42 and/or the base 44. As will be discussed later in more detail, the base 44 may comprise a cargo floor (not shown) in any of various types of transportation vehicles (not shown), including but not limited to aircraft, trucks, vessels, and the like.

The reconfigurable tie-down system 40 includes a plurality of tie-down devices 46 which tie-down the pallet 42 to anchors 50 that may have fixed locations on the base 44. The tie-down devices 46 are held in channels 48 on the pallet 42 which may allow the tie-down devices 46 to be moved to any of various tie-down locations 60 on the pallet 42, into proximity with an anchor 50 on the base 44. The ability of the tie-down devices 46 to be moved to differing tie-down locations 60 on the pallet 42 may allow the pallet 42 to be used with various layout patterns of anchors 50, thus providing the pallet 42 with increased flexibility and a potentially wider range of vehicle applications.

Attention is now directed to FIGS. 2, 3, 4 and 5 which illustrate use of the pallet 42 in a cargo airplane 54. The airplane 54 includes a cargo bay 55 that may be accessed through an aft door ramp 56 which may be used to aid in loading and unloading cargo 45. The cargo bay 55 includes a cargo floor 52 having a plurality of tie-down anchors 50 which may be used to tie-down pallets 42 and/or the cargo 45 to the floor 52. Each of the floor anchors 50 may include a recessed cup 67 in the floor 52 containing a tie-down ring 66 that may lay flush with the floor 52 when not in use. The floor 52 may include rollers 64 (FIG. 4) as well as guide rails 58 to aid in loading and unloading the pallets 42.

Figure 6:
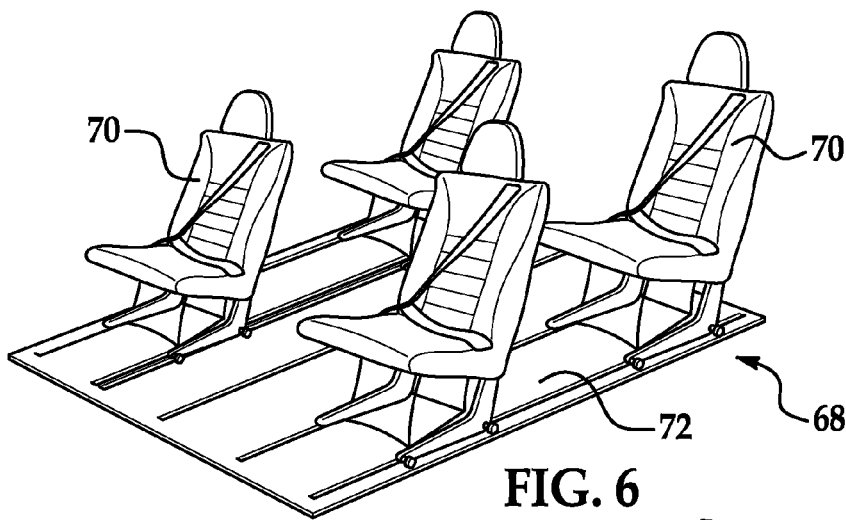
FIG. 6 is a perspective illustration of a pallet-based passenger seating module.
Figure 7:
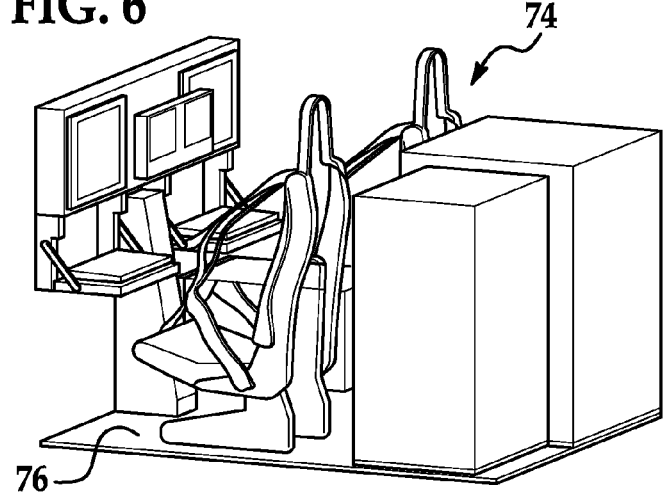
FIG. 7 is a perspective illustration of a pallet-based mission control module.

As used herein, "cargo" is intended to include a wide variety of materials, equipment and other payloads which may be removably or permanently secured to the pallet 42. For example, as shown in FIG. 6, the cargo 45 may comprise a seating module 68 including a plurality of passenger seats 70 secured to a flat base 72 which may be permanently or removably secured to one of the pallets 42, or which may comprise the pallet 42 itself. FIG. 7 illustrates another form of cargo 45 comprising a mission control module 74 supported on a base 76 that may form part of one of the pallets 42. The mission control module 74 may be used during a mission performed by the airplane 54, and later removed from the airplane 54 when the mission is complete.

Referring now particularly to FIG. 3, the pattern and/or placement of the anchors 50 on the floor 52 of the airplane 54 may vary according to the make, model or type of airplane 54. In the illustrated example, the floor anchors 50 are generally aligned along the longitudinal axis 62 of the floor 52, but are irregularly spaced along the length of the floor 52. In accordance with the disclosed embodiments, the tie-down devices 46 (FIG. 1) may be moved to different locations on the pallet 42 so as to register with those floor anchors 50 that are beneath or immediately adjacent to the pallet 42 in its final loading position.

Figure 8:
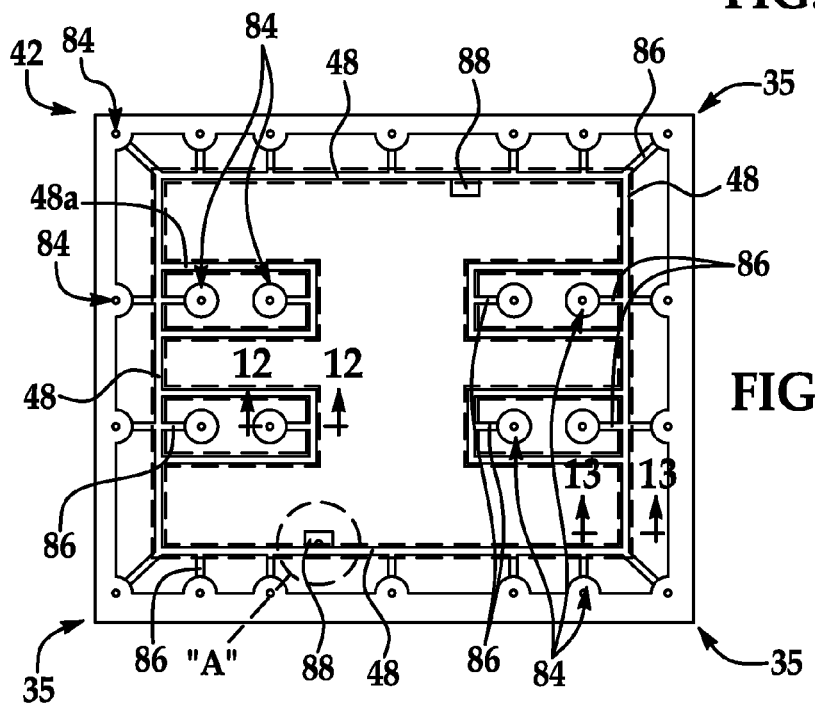
FIG. 8 is a plan illustration of the pallet showing one typical layout configuration of the reconfigurable tie-down system.

In the embodiment shown in FIGS. 3 and 8, the channel 48 extends both around the perimeter of the pallet 42 as well as to inboard locations 77. The channel 48 may be formed of any suitable, rigid material such as, without limitation, steel or aluminum, and may either be embedded in or form an integral part of the pallet 42. The channel 48 extends generally between a plurality of access openings 84 which pass through the thickness of the pallet 42 at locations where the pallet 42 may be tied down to floor anchors 50. In this illustrated embodiment, the access openings 84 define the possible tie-down locations 60 on the pallet 42. The number, pattern and layout of the access openings 84 will vary depending on the application, but generally, the access openings 84 will be located on the pallet 42 so that they are substantially longitudinally aligned with, and may be moved into registration over, as many of the floor anchors 50 as possible. In the illustrated example, eight of the access openings 84 are positioned at inboard location 77, and the remainder are spaced along the perimeter of the pallet 42, including the corners 35.

Figure 9:
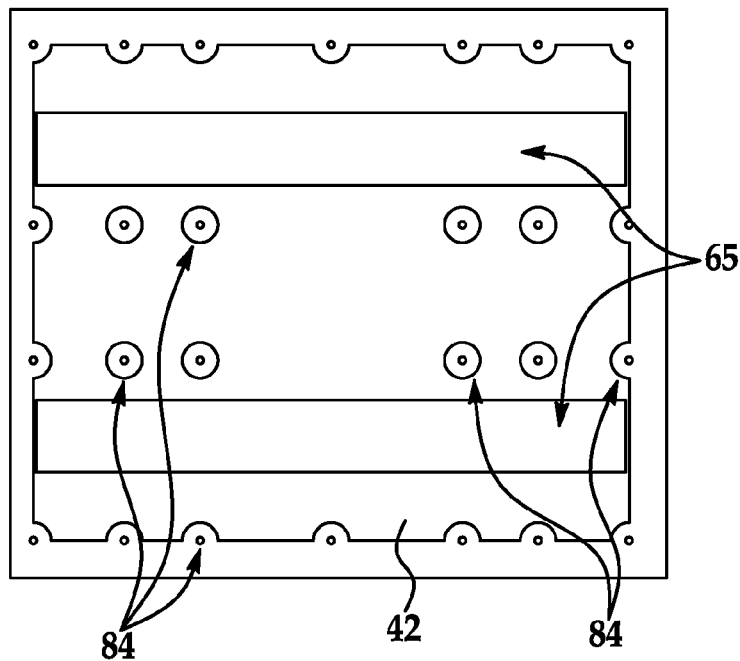
FIG. 9 is a plan illustration of the bottom of the pallet shown in FIG. 8.

FIG. 9 illustrates the bottom of the pallet 42, the surface configuration of which may vary depending upon the application. In the illustrated embodiment, the bottom of the pallet 42 includes two transversely spaced, longitudinally extending channels 65 which are adapted to receive and be supported on the cargo floor rollers 64 illustrated in FIG. 4.

Figure 16:
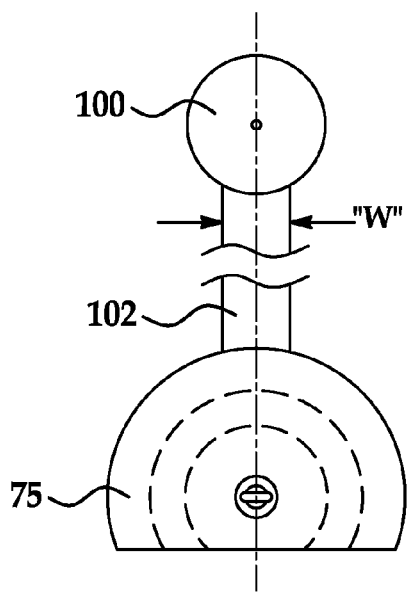
FIG. 16 is a plan illustration of the tie-down device shown in FIG. 15.

Referring now concurrently to FIGS. 8, 12, 13 and 16, the access openings 84 extend completely through the thickness of the pallet 42 so as to provide access to the floor 52 through the pallet 42. In the illustrated example, the pallet 42 may include a bottom layer 42a formed of a material, such as metal, which may be different from the remainder of the pallet 42, for purposes of durability, strength and other reasons. The channel 48 extends generally between the access openings 84. A keyhole-like slot 86 extends generally transverse to the adjoining channel 48, and is partially defined by an inclined bottom wall 96. Each of the slots 86 has a width "W" as shown in FIG. 16.

Figure 14:
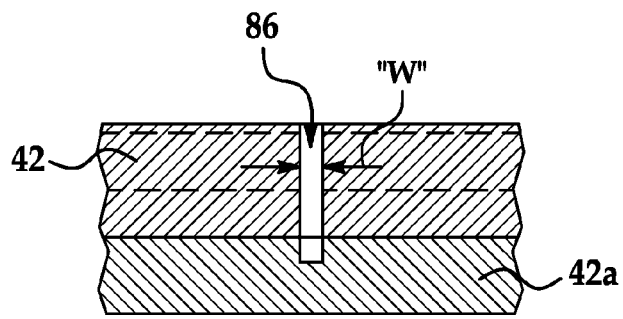
FIG. 14 is a sectional illustration taken along the line 14-14 in FIG. 12.
Figure 15:
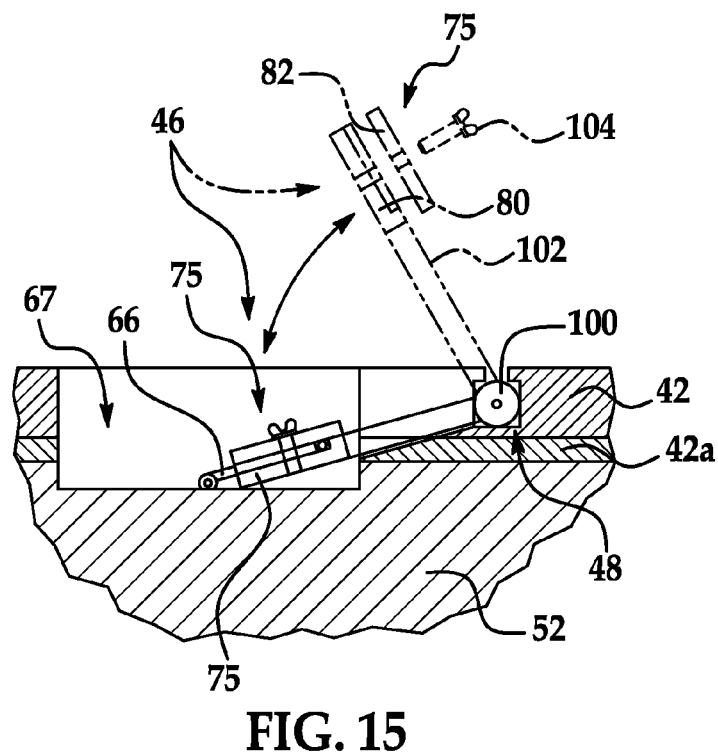
FIG. 15 is a sectional illustration of a tie-down device and a portion of the pallet.

Attention is now directed to FIGS. 15, 16, 17, 18 and 19 which illustrate additional details of the tie-down device 46. The tie-down device 46 includes a spherical base 100 connected to an end effector 75 by an extension arm 102. As illustrated in a later discussed embodiment (FIGS. 21 and 22), the extension arm 102 may have an adjustable length to provide the tie-down device 46 with some degree of adjustability in order to accommodate slight variations of the positions of the floor anchors 67. The extension arm 102 has a width "w" which is substantially equal to or marginally smaller than the width "W" of the slot 86 shown in FIG. 14.

Figure 13:
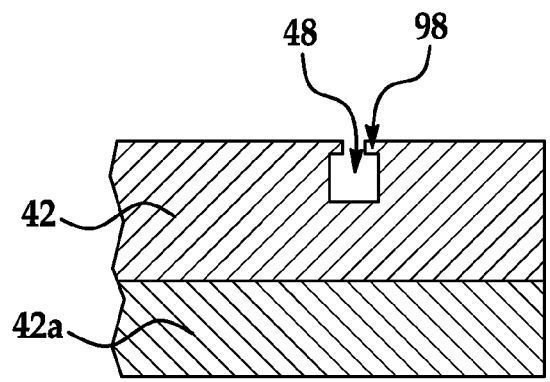
FIG. 13 is a sectional illustration taken along the line 13-13 in FIG. 8.

The spherical base 100 forms a ball joint connection with, and is slideably received within the channel 48, thereby allowing the tie-down device 46 to slide along the pallet 42 to locations adjacent to any of the access openings 84. As shown in FIG. 13, return flanges 98 partially defining the channel 48, function to retain the spherical base 100 within the channel 48 as the tie-down device 46 slides between access openings 84. When the extension arm 102 is aligned with one of the slots 86 adjacent an access opening 84, the tie-down device 46 may be pivoted about the spherical base 100 between a standby position shown in dashed lines in FIG. 15, and a deployed condition shown in full lines.

Figure 17:
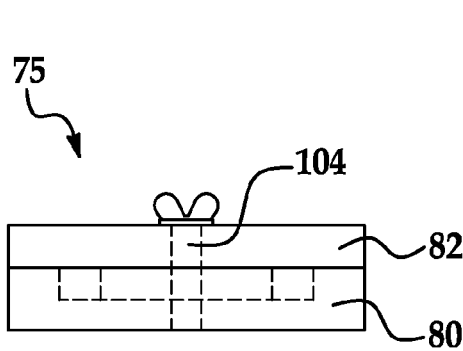
FIG. 17 is a end view illustration of an end effector forming part of the tie-down device shown in FIGS. 15 and 16.
Figure 18:
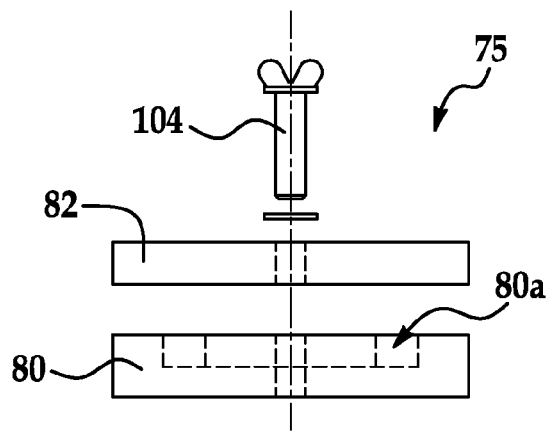
FIG. 18 is an illustration similar to FIG. 17 but exploded to show the retainer cap and fastener.
Figure 19:
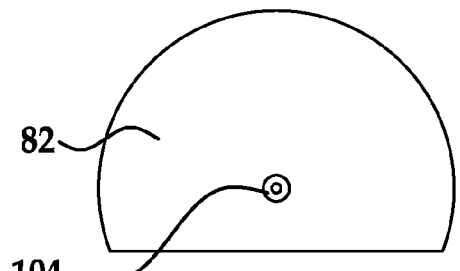
FIG. 19 is a plan illustration of the retainer cap shown in FIGS. 17 and 18.

As seen in FIGS. 17 and 18, the end effector 75 includes a ring receiver 80 having a recess 80a adapted to receive a tie-down ring 66 therein. A retainer cap 82 is removably secured to the ring receiver 80 by a fastener 104 which may comprise, for example and without limitation, a Camloc® device which is used extensively in the aircraft industry. The tie-down ring 66 is captured and held within the recess 80a between the ring receiver 80 and the retainer cap 82. As will be discussed below, the end effector 75 may take any of various forms, depending upon the particular type of anchor 50 used in the cargo floor 52.

Figure 10:
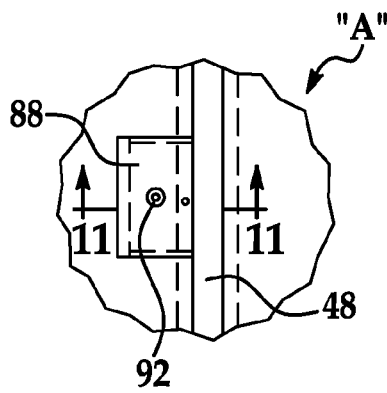
FIG. 10 is an enlarged and rotated illustration of the area designated as "A" in FIG. 8.
Figure 11:
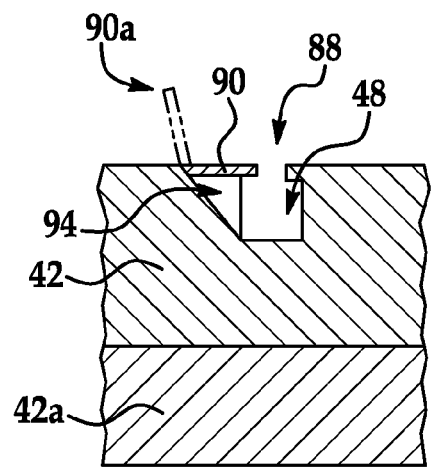
FIG. 11 is a sectional illustration taken along the line 11-11 in FIG. 10.
Figure 12:
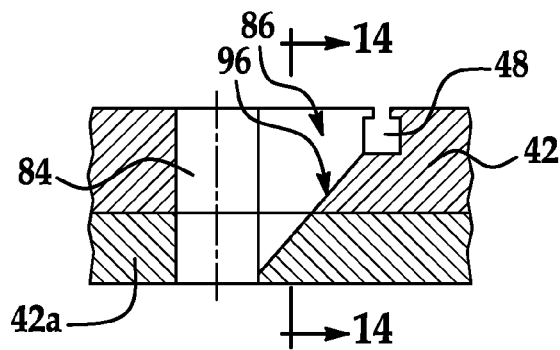
FIG. 12 is a sectional illustration taken along the line 12-12 in FIG. 8.

Referring now to FIGS. 8, 10 and 11, one or more access stations 88 may be provided along the length of the channel 48 to allow installation and removal of the tie-down devices 46. The access station 88 includes a cutout area 94 in the pallet 42 which is open to the channel 48 and is covered by a hinged access door 90. The access door 90 may be swung to an open position 90a (FIG. 11) to reveal the cutout 94, which, in the illustrated example is generally rectangular in shape as shown in FIGS. 8 and 10. The width of the cutout area 94 is sufficient to allow the base 100 of the tie-down device 46 to be removed from the channel 48 and stowed until needed for a future tie-down operation. When closed, the access door 90 lies flush with the floor 52 so as not to present an obstruction on the pallet 42.

Referring now to FIGS. 8-19, in use, either before or after cargo 45 has been placed on the pallet 42, an appropriate number of tie-down devices 46 may be installed on the pallet 42 by inserting the bases 100 of the devices 46 into the channel 48 at one of the access stations 88. Each of the tie-down devices 46 is then traversed along the channel 48 and positioned adjacent an access opening 84 that is vertically registered over one of the floor anchors 50. At this point, the tie-down device 46 is in its raised, standby position shown in dashed lines in FIG. 15, with the extension arm 102 aligned with one of the slots 86. The tie-down device 46 is then pivoted downwardly to the deployed position shown in full lines in FIG. 15. As the tie-down device is pivoted toward its deployed position, the extension arm 102 is received within and frictionally engages the walls of the slot 86. The slot 86 locks the extension arm 102, and thus the entire tie-down device 46, against lateral movement while in the deployed position. The fastener 104 is released and the retainer cap 82 is removed, following which the tie-down ring 66 is placed in the recess 80a of the ring receiver 80. The length of the extension arm 102 may be adjusted, as necessary so that the tie-down ring 66 registers with the recess 80a.

Next, the retainer cap 82 is placed on the ring receiver 80 and the fastener 104 is reinstalled, thereby locking the ring 66 in the end effector 75 to complete the tie-down process. The tie-down devices 46 restrain the load of the pallet 42 against substantial movement in all directions except downward movement which is prevented by the floor 52. The extension arms 102 transmits lateral loads between the floor 52 and the pallet 42. Although not shown in the illustrations, additional restraining members may be located around the perimeter of the pallet 42 to provide additional support for the tie-down devices 46. These additional restraining members may be connected to the exterior sides of the pallet 42 located at each of the slots 86 which swing down and lock into place to create a secure attachment to the floor 52. When the tie-down devices 46 are not deployed, they may be stowed within those slots 86 that are not in use, and latched inboard by the restraining members so as to not interfere with normal use of the pallet 42.

Figure 20:
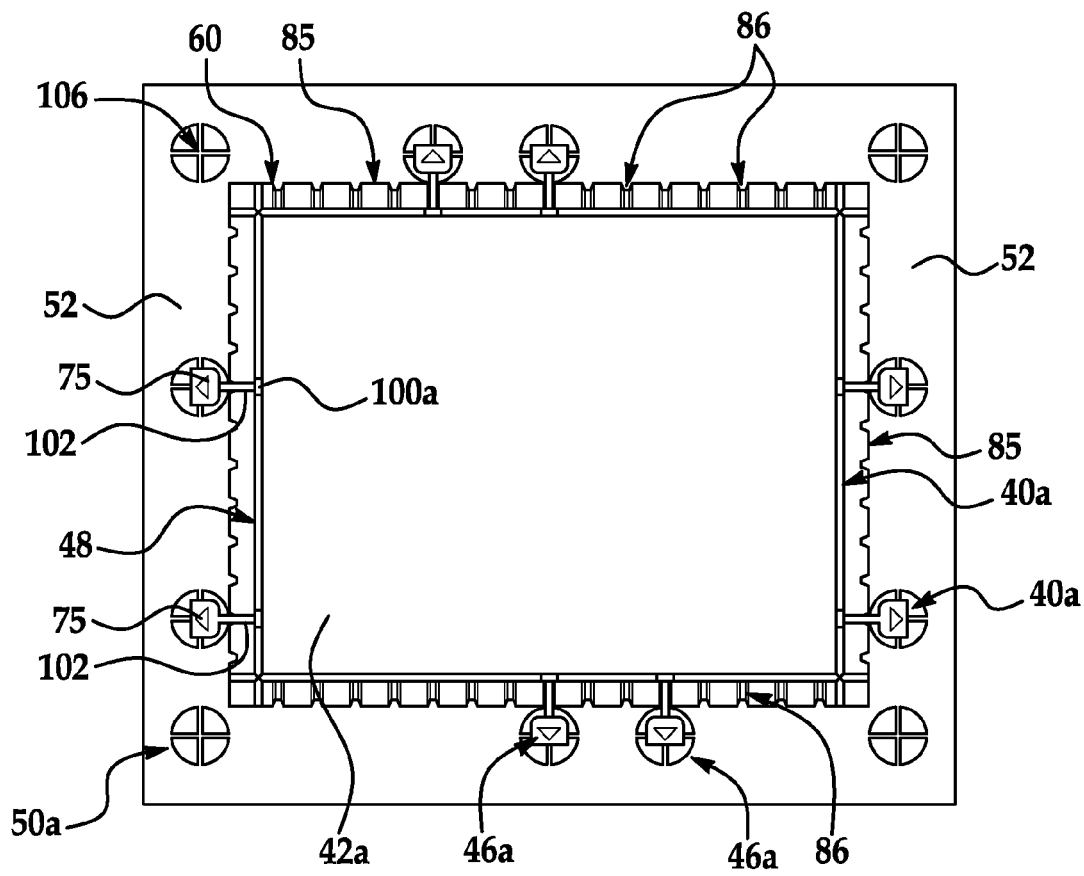
FIG. 20 is a plan illustration of another embodiment of a pallet having a reconfigurable tie-down system, along with a cargo floor on which the pallet is supported.
Figure 21:
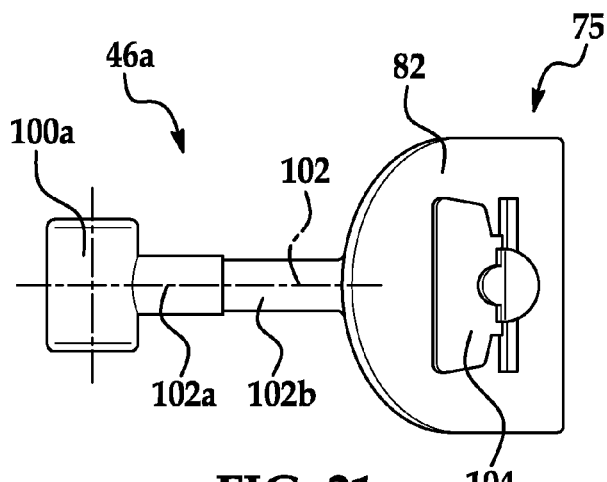
FIG. 21 is a plan illustration of a tie-down device forming part of the reconfigurable tie-down system shown in FIG. 20.
Figure 22:
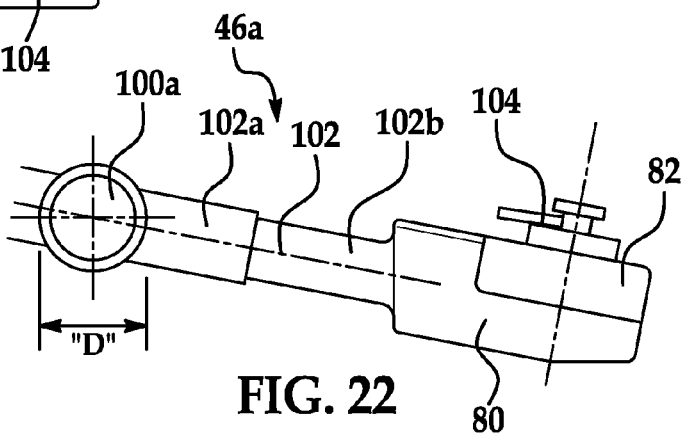
FIG. 22 is a side view illustration of the tie-down device shown in FIG. 21.
Figure 23:
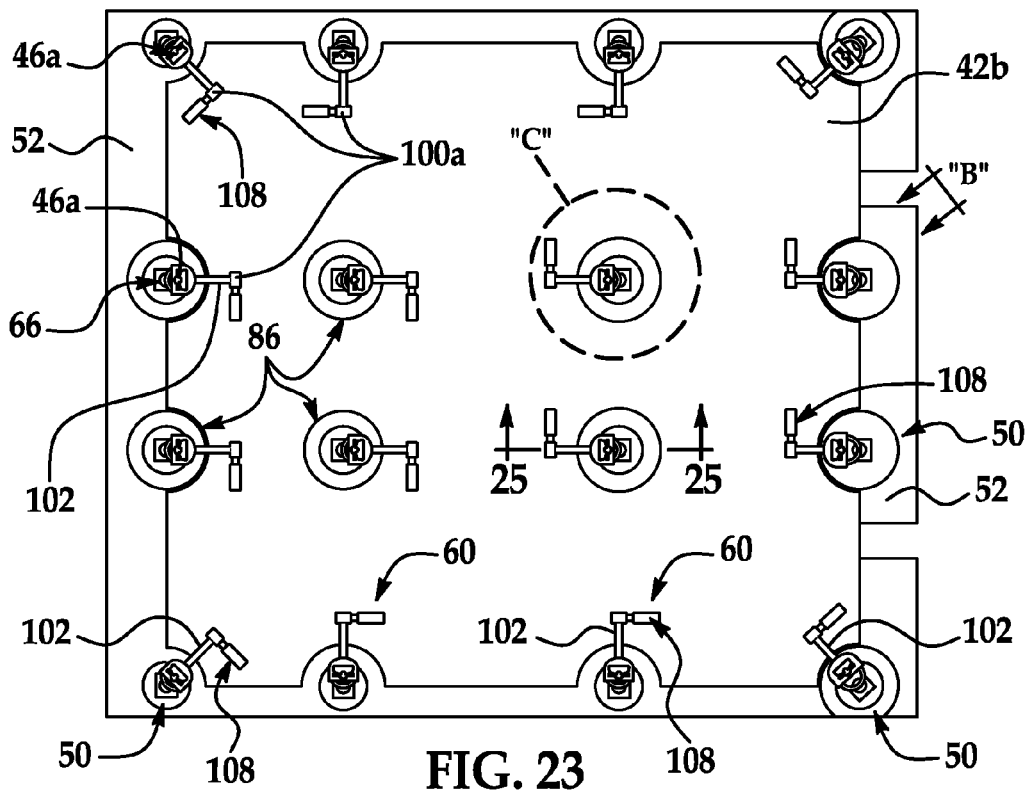
FIG. 23 is a plan illustration of a further embodiment of a pallet having another form of a reconfigurable tie-down system, wherein the pallet is supported on a cargo floor.

Attention is now directed to FIGS. 20, 21 and 22 which illustrate an alternate embodiment of a pallet 42a having a reconfigurable tie-down system 40a. In this example, the cargo floor 52 is provided with a plurality of recessed floor anchors 50a formed by fixed cross bars 106 to which cargo 45 and/or the pallet 42a may be tied down. The pallet 42a includes a channel 48 extending around its rectangular periphery. The channel 48 may be similar to the channel 48 previously described in connection with FIGS. 8-15. The pallet 42a further includes a plurality of spaced apart slots 86 spaced along the length of the channel 48 which extend substantially transverse to and between the outer edge 85 of the pallet 42a and the channel 48. The slots 86 respectively represent a plurality of tie-down locations 60 on the pallet 42a at which the repositionable tie-down devices 46a may be positioned, overlying one of the floor anchors 50a.

Referring particularly to FIGS. 21 and 22, the tie-down device 46a includes an end effector 75, and a generally cylindrical base 100a connected by an extension arm 102. The extension arm 102 may include first and second telescoping sections 102a, 102b that are connected by internal threads (not shown) which allow adjustment of the length of the extension arm 102. The cylindrical base 100a has a diameter "D" which is only slightly less than the diameter or width of the channel 48 so as to allow the base 100a to freely slide throughout the length of the channel 48. The end effector 75 includes a receiver 80 configured to receive and grip the cross bars 106 of the floor anchors 50a. A retainer cap 82 may be secured by a quick release fastener 104 over the retainer 80 in order to lock the end effector 75 to the floor anchor 50a.

Figure 24:
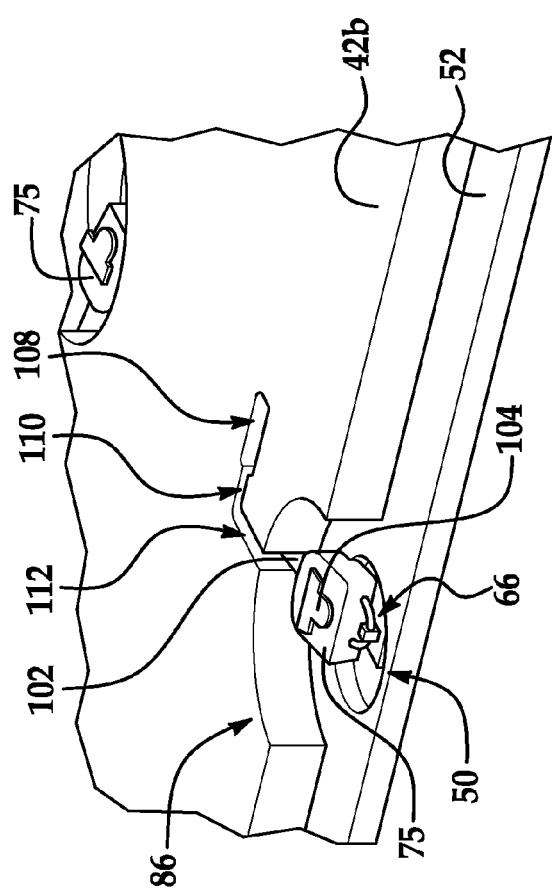
FIG. 24 is a perspective illustration taken in the direction "B" shown in FIG. 23.
Figure 25:
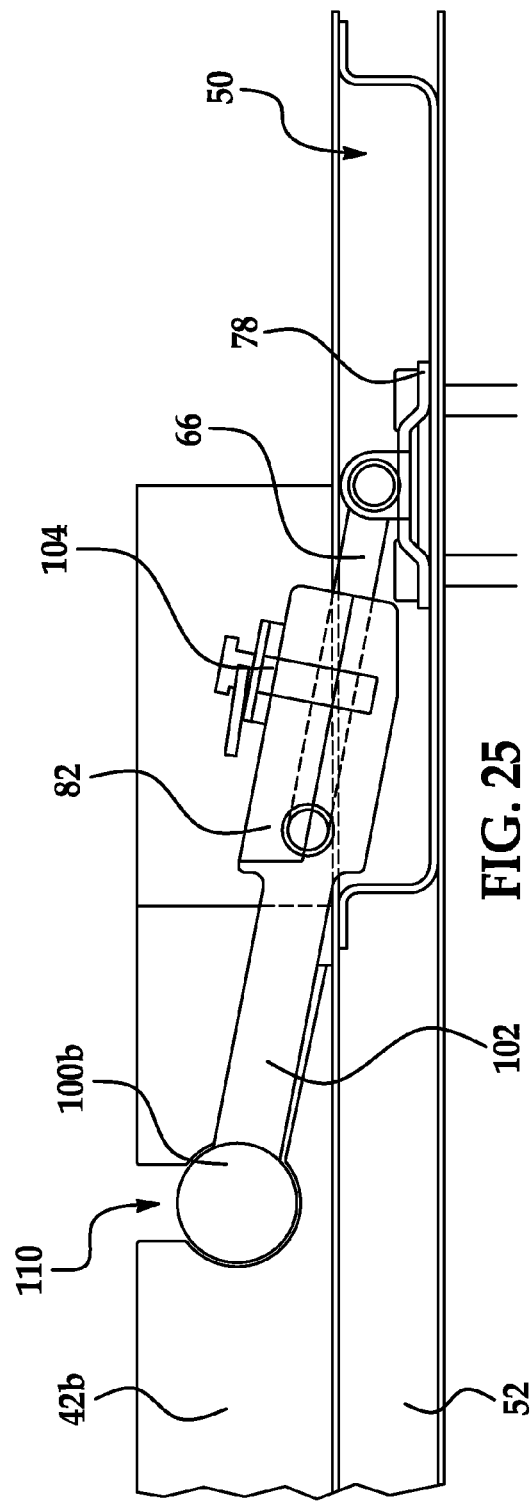
FIG. 25 is a sectional illustration taken along the line 25-25 in FIG. 23.
Figure 26:
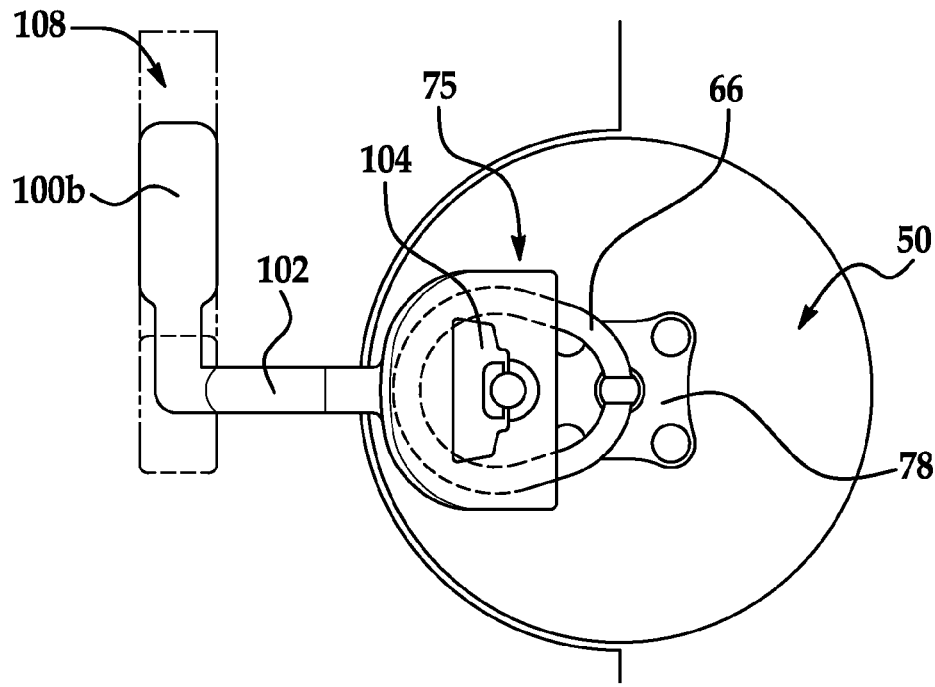
FIG. 26 is a plan illustration of the area designated as "C" in FIG. 23.

A further embodiment is illustrated in FIGS. 23-26. A plurality of tie-down devices 46 may be removably mounted in channels 108 in the pallet 42b at tie-down locations 60 so as to access tie-down rings 66 in the floor 52 through selectively placed access openings 86 in the pallet 42b. As best seen in FIGS. 24 and 25, the channel 108 includes a narrowed section 110 which functions to retain the cylindrical base 100b within the channel 108. A slot 112, similar to the slot 86 previously described (see FIG. 14), extends between channel 108 and the access opening 86 to allow the extension arm 102 to pass partially through the pallet 42b. The end effector 75 is similar to that previously described, and functions to grab and hold a tie-down ring 66 of the floor anchor 50.

In use, the tie-down devices 46a may be installed only at those locations on the pallet 42b where an access opening 86 substantially registers with a floor anchor 50. The tie-down device 46a is installed by placing the cylindrical base 100a in the channel 108, and then sliding the base 100b beneath the narrowed section 110 until it is captured within the pallet 42b, and the extension arm 102 is aligned with the slot 112. The tie-down device 46 may then be swung downwardly into a deployed position, following which the tie-down ring 66 may be clamped within the end effector 75. The slot 112 closely receives the extension arm 102 so as to prevent lateral movement of the tie-down device 46*a* after its deployment.

Figure 27:
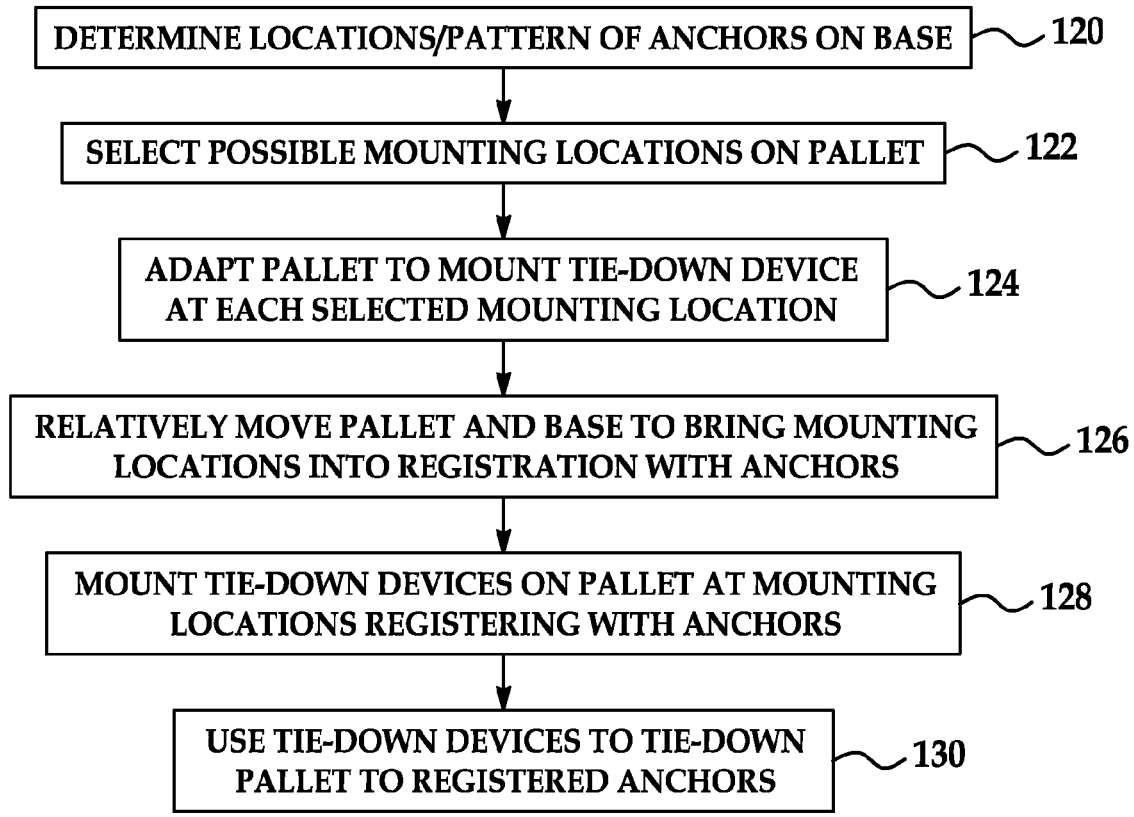
FIG. 27 illustrates a flow diagram showing the steps of a method of tying down a pallet using the reconfigurable tie-down system of the disclosed embodiments.

Attention is now directed to FIG. 27 which illustrates a method for tying down a pallet 42 on a base 44 such as the cargo floor 52 previously described. Beginning at step 120, the locations and pattern of the floor anchors 50 are determined. Next, at 122, possible mounting locations on the pallet 42 are selected which result in maximum potential registrations between the possible tie-down device 46 locations and the locations of the floor anchors 50. At step 124, the pallet 42 is adapted to mount the tie-down devices 46 at each selected mounting location. At 126, the pallet 42 and the base 44 are moved relative to each other in order to bring the tie-down mounting locations into registration with the floor anchors 50. At 128, the tie-down devices 46 are mounted on the pallet 42 at those locations that may register with the floor anchors 50. Finally, at 130, the tie-down devices 46 having been installed, the installed tie-down devices 46 may be used to tie-down the pallet 42 to the floor anchors 50.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of tying down a pallet atop a base, comprising:
selecting a plurality of tie-down locations on the pallet that may be brought into registration with anchors below the pallet in the base;
relatively moving the pallet and the base to bring at least certain of the tie-down locations on the pallet into registration above at least certain of the anchors below the pallet in the base;
mounting a tie-down device in a channel on the pallet at each of the tie-down locations that have been brought into registration with one of the anchors and sliding the tie-down devices within the channel to the tie-down locations registered with the anchors; and,
using the tie-down devices to tie-down the pallet to the anchors registered with the tie-down locations on the pallet.

2. The method of claim 1, further comprising:
stowing at least certain of the tie-down devices during non-use by locking the at least certain tie-down devices in the channel.

3. The method of claim 1, wherein mounting the tie-down devices includes locking the tie-down devices against sliding movement in the channel.

4. The method of claim 1, wherein using the tie-down devices to tie-down the pallet includes using the tie-down devices to grab and hold the anchors registered with the tie-down locations on the pallet.

5. The method of claim 1, further comprising forming access openings extending through a thickness of the pallet at each of the selected tie-down locations.

6. A method of tying down a cargo pallet on the floor of an aircraft, comprising:
providing a pallet;
determining the location of a set of anchors in the floor of the aircraft;
selecting a plurality of tie-down locations on the pallet that may be brought into registration with the anchors in the floor when the pallet is moved across the floor;
installing a reconfigurable tie-down system on the pallet including—
forming a plurality of access openings in the pallet allowing access to the floor of the aircraft through the pallet,
forming a channel in the pallet extending between the access openings, and,
installing a plurality of tie-down devices in the channel;
moving the pallet over the floor of the aircraft and bringing at least certain of the tie-down locations on the pallet into registration with at least certain of the anchors;
sliding at least certain of the tie-down devices along the channel to the access openings registered with the anchors;
locking the certain tie-down devices in place at the access openings; and
using the certain tie-down devices to engage and tie-down the pallet to the anchors.

\* \* \* \* \*